(12) United States Patent
Magi Shaashua et al.

(10) Patent No.: US 9,917,846 B1
(45) Date of Patent: Mar. 13, 2018

(54) METHOD OF DEFINING THE USER'S GEOGRAPHIC AREAS FOR RISK ASSESSMENT PURPOSES IN MOBILE CHANNELS

(75) Inventors: Triinu Magi Shaashua, Herzeliya (IL); Harel Efraim, Hod-Hasharon (IL); Ayelet Levin, Pardes Hanna Karkur (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 863 days.

(21) Appl. No.: 13/340,829

(22) Filed: Dec. 30, 2011

(51) Int. Cl.
*H04L 9/08* (2006.01)
*H04L 29/06* (2006.01)

(52) U.S. Cl.
CPC .................. *H04L 63/107* (2013.01)

(58) Field of Classification Search
CPC ........................ G06Q 20/4016; G06Q 40/00
USPC ....................................................... 705/36 R
See application file for complete search history.

(56) References Cited

U.S. PATENT DOCUMENTS

| | | | | |
|---|---|---|---|---|
| 7,574,606 B1* | 8/2009 | Fan | ........................ | G06Q 20/32 713/179 |
| 7,908,215 B2* | 3/2011 | Armes | ................... | G06Q 20/10 705/40 |
| 7,908,645 B2* | 3/2011 | Varghese et al. | ................. | 726/4 |
| 8,095,519 B2* | 1/2012 | Delia | .................... | G06F 21/316 705/44 |
| 8,311,863 B1* | 11/2012 | Kemp | ................ | G06Q 10/0639 705/7.11 |
| 2006/0006227 A1* | 1/2006 | Williams | ...................... | 235/380 |
| 2006/0282660 A1* | 12/2006 | Varghese | ............. | G06Q 20/341 713/155 |
| 2010/0000197 A1* | 1/2010 | Snyder et al. | ................. | 60/39.5 |
| 2011/0307478 A1* | 12/2011 | Pinckney | ............ | G06N 99/005 707/724 |

OTHER PUBLICATIONS

Transportation mode detection using mobile phones and GIS Information, Nov. 1-4, 2011.*

* cited by examiner

*Primary Examiner* — Bruce I Ebersman
(74) *Attorney, Agent, or Firm* — BainwoodHuang

(57) ABSTRACT

An improved technique identifies risky transactions by mapping raw user location data to a particular cell in a fixed grid. Along these lines, when a user initiates a transaction with a service provider over a mobile device, the service provider collects raw location data such as a latitude and longitude for the user and transmits the location data to an adaptive authentication server. The adaptive authentication server then accesses a fixed set of geographical areas overlaid on a map of the Earth. For example, the geographic areas can correspond to square cells whose corners are defined by selected latitudes and longitudes. The adaptive authentication server finds a particular geographical area which contains the latitude and longitude for the user. Based on an identifier of the particular geographical area, the adaptive authentication server assigns a risk score to the transaction.

15 Claims, 4 Drawing Sheets

METHOD OF DEFINING THE USER'S GEOGRAPHIC AREAS FOR RISK ASSESSMENT PURPOSES IN MOBILE CHANNELS

BACKGROUND

Some service providers use conventional risk-based authentication systems to assess risks of processing customer transactions. For example, an online bank may employ a risk engine of such a risk-based authentication system to assign risk scores to banking transactions where higher risk scores indicate higher risk.

In generating a risk score, the risk engine takes, as input values, various transaction attributes (e.g., time of receipt, IP address). For each customer of the online bank, there is an associated history based on values of the transaction attributes associated with previous transactions involving that customer. The risk engine incorporates the history associated with the customer into an evaluation of the risk score. Significant variation of one or more attribute values from those in the customer's history may signify that the banking transaction has a high risk.

For example, suppose that a particular customer historically submitted transaction requests to the online bank at 3:00 PM from a particular internet service provider (ISP), and, under the customer's identifier, a user submits a new transaction request at 2:00 AM from a different ISP. The different ISP would give rise to a different IP address than that historically associated with the particular customer. In this case, owing to the different IP address and the unusual time that the transaction was submitted, the risk engine would assign a larger risk score to a transaction resulting from the new transaction request.

SUMMARY

Unfortunately, there are deficiencies with the above-described conventional risk-based authentication systems. For example, an IP address can be used to determine an approximate geolocation from which a user connected to a network via an ISP submits a transaction request. However, for a user conducting a transaction from a mobile device, geolocation is typically derived from a cell tower identifier or GPS coordinates.

Because of the nature of data gathering from cell towers and GPS units in mobile devices, it is possible that a risk-based authentication system could perceive a small change in location as a large change and therefore deem it risky. In particular, a typical resolution for geolocation from GPS coordinates is about 25 meters, although this number can vary. The translation of GPS coordinates into a geolocation at such a resolution is frequently very sensitive to noise and other external factors. For example, at one instant, a first user conducts a transaction with the mobile device facing north, resulting in a geolocation from the GPS coordinates that includes a first address. A second user conducts another transaction from the same location with the mobile device facing east, resulting in a geolocation from slightly different GPS coordinates that includes a second address differing from the first address. The second address may be a few meters or as far as several kilometers away from the first address. Similar problems also exist in non-GPS methods of collecting geolocation such as cell tower triangulation. For example, two users in a city having many cell towers can have cell signals point to different cell towers despite the users being a few centimeters apart; such users would be assigned geolocations much further apart than their actual locations.

Such hypersensitivity to noise and other external factors presents a problem for conventional risk-based authentication systems. Because the conventional risk-based authentication systems described above rely on previous behavior of attributes such as geolocation, a noisy history of geolocation may lead to inaccurate risk scores being assigned to transactions. In other words, when the process of obtaining geolocation is excessively noisy and therefore unrepeatable, conventional risk-based authentication systems may create a large number of false positives, undermining the ability to identify the riskiest transactions.

It should be understood that, in many cases, the resolution for geolocation need not be a few meters as described above. For example, a typical user exhibits regular behavior within a 10 km radius. In particular, the typical user may be at his home during a first set of hours, and at his work during a second set of hours. Additionally, a typical fraudster operates far from the places where the typical user conducts transactions.

In contrast to conventional risk-based authentication systems which assign risk scores that are susceptible to noise in geolocation data, an improved technique identifies risky transactions by mapping raw user location data to a particular cell in a fixed grid. Along these lines, when a user initiates a transaction with a service provider over a mobile device, the service provider collects raw location data such as a latitude and longitude for the user and transmits the location data to an adaptive authentication server. The adaptive authentication server then accesses a fixed set of geographical areas overlaid on a map of the Earth. For example, the geographic areas can correspond to square cells whose corners are defined by selected latitudes and longitudes. The adaptive authentication server finds a particular geographical area which contains the latitude and longitude for the user. Based on an identifier of the particular geographical area, the adaptive authentication server assigns a risk score to the transaction.

Advantageously, the improved technique allows for a more accurate determination of risk from a user's geolocation. By identifying a user's location as being within a particular cell of a fixed grid, the behavior of a user's location is desensitized to location errors. This desensitizing of the user's location increases the accuracy of adaptive authentication. For example, suppose that a particular region is 10 km by 10 km and includes a user's home. Suppose that, on two separate occasions, the user initiates a transaction from his home; the raw location data provides locations near the house, but 500 meters apart. Nevertheless, the two locations are within the particular region, so that the geolocation data does not change in this instance, as expected.

One embodiment of the improved technique is directed to a method of identifying risky transactions. The method includes generating a set of geographical areas, each geographical area of the set of geographical areas including an area identifier and being fixed with respect to the Earth's surface. The method also includes receiving, from a service provider, a transaction which includes location data of a user device in communication with the service provider, the location data corresponding to a single point on the Earth's surface. The method further includes mapping the location data to a particular geographical area of the set of geographical areas. The method further includes generating an authentication result based on the area identifier of the particular geographical area, the authentication result including a risk score indicative of a likelihood that the transaction is risky. The method further includes sending the authentication result to the service provider.

Additionally, some embodiments of the improved technique are directed to an apparatus for identifying risky transactions. The system includes a network interface coupled to a network, a memory and processor coupled to the memory, the processor configured to carry the method of identifying risky transactions.

Furthermore, some embodiments of the improved technique are directed to a computer program product having a non-transitory computer readable storage medium which stores code including a set of instructions to carry the method of identifying risky transactions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique identifies risky transactions by mapping raw user location data to a particular cell in a fixed grid. Along these lines, when a user initiates a transaction with a service provider over a mobile device, the service provider collects raw location data such as a latitude and longitude for the user and transmits the location data to an adaptive authentication server. The adaptive authentication server then accesses a fixed set of geographical areas overlaid on a map of the Earth. For example, the geographic areas can correspond to square cells whose corners are defined by selected latitudes and longitudes. The adaptive authentication server finds a particular geographical area which contains the latitude and longitude for the user. Based on an identifier of the particular geographical area, the adaptive authentication server assigns a risk score to the transaction.

Figure 1:
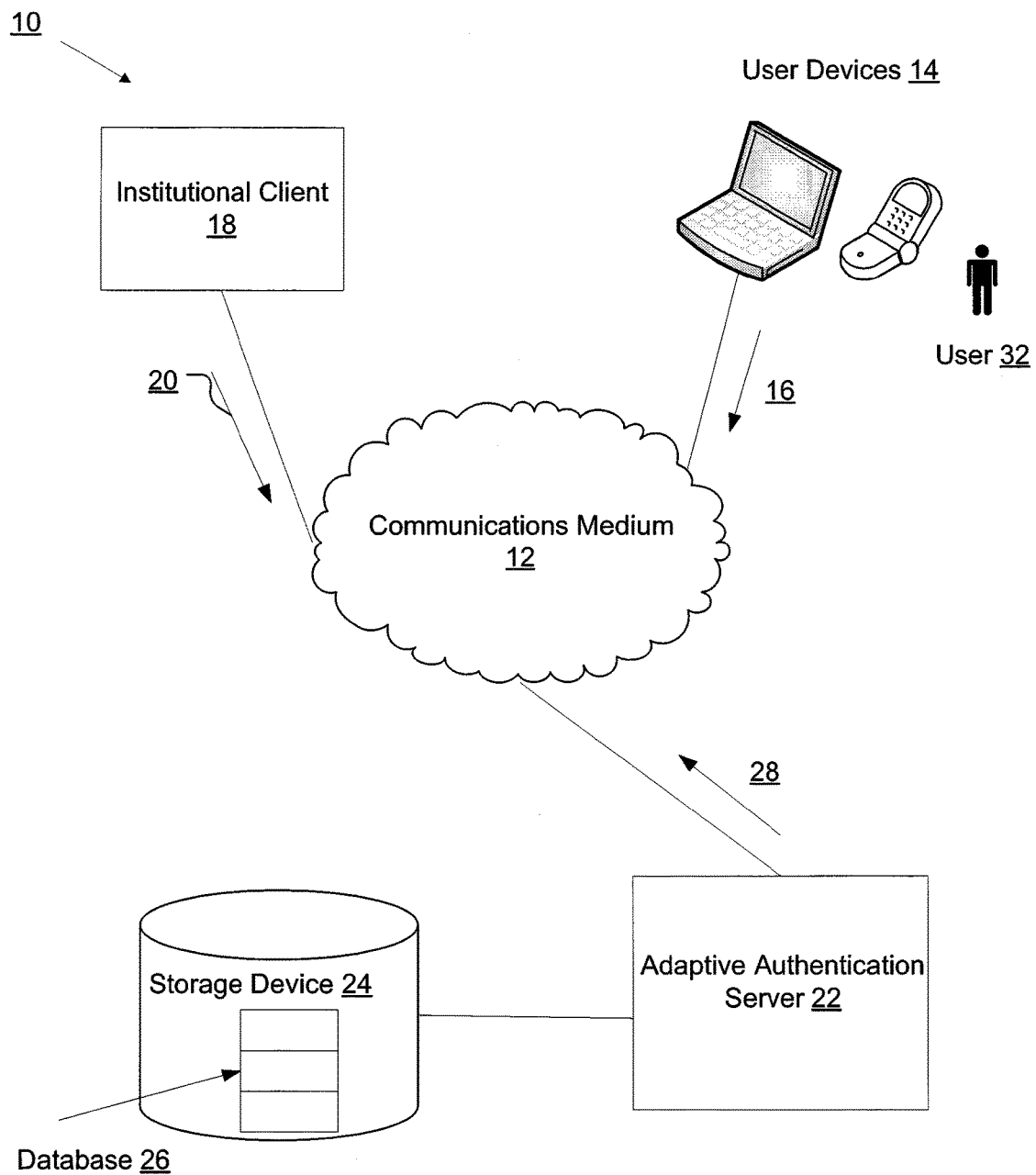
FIG. 1 is a schematic diagram illustrating an electronic environment for carrying out the improved technique.

FIG. 1 illustrates an electronic environment 10 for carrying out the improved technique. Electronic environment 10 includes communications medium 12, user devices 14, institutional client 18, and adaptive authentication server 22.

Communication medium 12 provides network connections between user devices 14, institutional client 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to institutional client 18 via communications medium 12.

Institutional client 18 is constructed and arranged to send transaction 20 to adaptive authentication server 22 via communications medium 12. Institutional client 18 is also constructed and arranged to obtain geolocation data from transaction request 16. Institutional client 18 is further constructed and arranged to receive adaptive authentication result 28 from adaptive authentication server 22.

Adaptive authentication server 22 is constructed and arranged to receive transaction 20 from institutional client 18 over communications medium 12, including user location data. Adaptive authentication server 22 is also constructed and arranged to map user location data to a geographical area having an identifier. Adaptive authentication server 22 is also constructed and arranged to access previous transaction data in database 26 stored on storage device 24. Adaptive authentication server 22 is further constructed and arranged to generate adaptive authentication results based on the identifier of the geographical area and the previous transaction data. Adaptive authentication server 22 is further constructed and arranged to send adaptive authentication results 28 to institutional client 18.

During operation, a user 32 on user device 14 submits a transaction request 16 under a customer's user identifier to institutional client 18 via communications medium 12. From transaction request 16, institutional client 18 acquires longitude and latitude information for user device 14. For example, if user device 14 is a smartphone with a GPS unit, institutional client 18 derives a single longitude and latitude point from GPS coordinates embedded within transaction request 16. Institutional client 18 then sends transaction 20 to adaptive authentication server 22 in order to obtain authentication results concerning user 32.

Adaptive authentication server 22, prior to institutional client 18 receiving transaction request 16, had generated a set of geographical areas fixed with respect to the Earth's surface. Each of the geographical areas has an identifier by which adaptive authentication server 22 refers to the geographical area. For example, adaptive authentication server 22 breaks the Earth's surface into equally-sized grids and each of the geographical areas takes the form of a spherical square. Each side of the spherical square subtends an equiangular range of longitude or latitude. Adaptive authentication server 22 stores the generated set of geographical areas in database 26.

Adaptive authentication server 22 receives transaction 20 and searches transaction 20 for the single longitude and latitude point. Adaptive authentication server 22 then accesses, from database 26, an array of geographical areas representing a division of the Earth's surface. For example, the array of geographical areas are stored in the database as a set of fixed latitude and longitude coordinates defining a grid of fixed areas which cover the Earth's surface. Each fixed area is a spherical square as described above.

It should be understood that, when the geographical areas are small compared to the Earth's surface, the spherical squares are essentially squares with sides of equal distance.

Adaptive authentication server 22 then finds a particular geographical area that contains the single longitude and latitude point. Computational geometric methods exist that identify a particular area that contains a given point in the more general case of the particular area being defined as a polygon via a set of vertices. Such methods extend to the example of the spherical square, although adaptive authentication server 22 can use simpler methods in this case.

It should be understood that each geographical area has an identifier by which adaptive authentication server 22 identifies the area in database 26. Along these lines, adaptive authentication server 22 uses such identifiers to track geolocation behavior for user 32 and, consequently, base risk score assignment on such geolocation behavior.

Adaptive authentication server 22 uses the identifier from the particular geographical area that identifies the location of user 32 to assign a risk score to transaction 20. Once the risk score is assigned, adaptive authentication server 22 sends authentication result 28 which contains the risk score assigned to transaction 20 to institutional client 18.

Advantageously, the improved technique allows for a more accurate computation of risk score from location data of user 32. By identifying the single longitude and latitude point as being within a particular geographical area having an identifier, the behavior of the location of user 32 is desensitized to small changes in location. This desensitizing of the location of user 32 increases the accuracy of adaptive authentication. For example, suppose that a particular region is 10 km by 10 km and includes a home of user 32. Suppose that, on two separate occasions, user 32 initiates transaction request 16 from his home; the raw location data provides locations near the house, but 500 meters apart. Nevertheless, the two locations are within the particular region, so that the geolocation data does not change in this instance, as expected.

Figure 2:
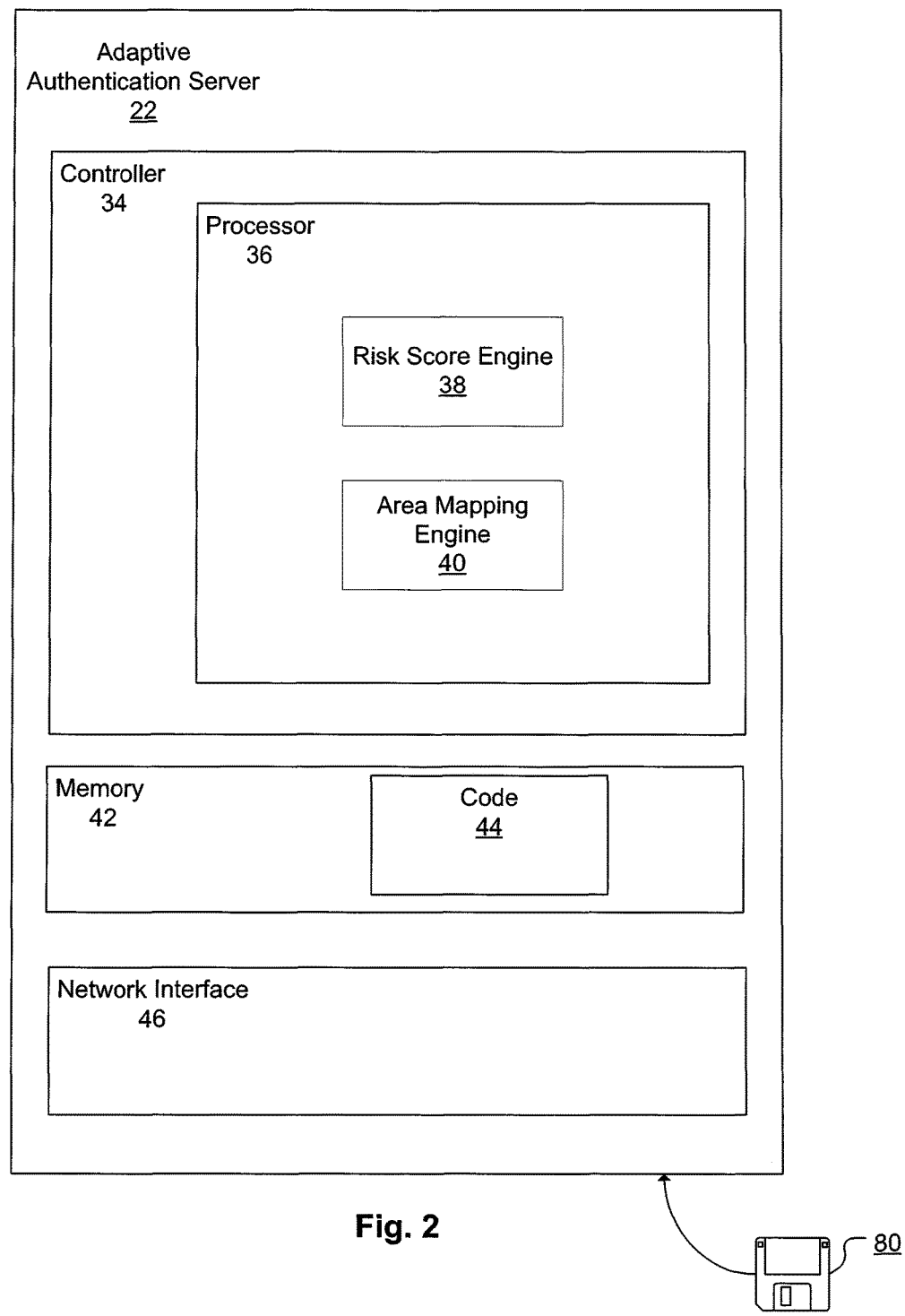
FIG. 2 is a schematic diagram illustrating the adaptive authentication engine within the electronic environment shown in FIG. 1.

Further details concerning adaptive authentication server 22 are considered with respect to FIG. 2.

FIG. 2 illustrates components of adaptive authentication server 22. Adaptive authentication server 22 includes a controller 20 which in turn includes processor 22, a memory 24 and a network interface 26.

Memory 42 is configured to store code which includes code 44 constructed and arranged to identify risky transactions. Memory 42 is also configured to store transaction 20 received from institutional client 18. Memory 42 generally takes the form of, e.g., random access memory, flash memory or a non-volatile memory.

Processor 36 takes the form of, but is not limited to, Intel or AMD-based MPUs, and can include a single or multicores each running single or multiple threads. Processor 36 is coupled to memory 42 and is configured to execute instructions from code 44 stored in memory 42. Processor 36 includes risk score engine 38 and area mapping engine 40.

Risk score engine 38 is constructed and arranged to assign a risk score to a transaction based on values of attributes of previous transactions and transaction 20 stored in memory 42 and an identifier of a geographical area, information about which is stored in database 26.

Area mapping engine 40 is constructed and arranged to generate a fixed set of geographical areas and store the set in database 26. Area mapping engine 40 is also constructed and arranged to map longitude and latitude points to a particular geographical area.

Network interface 46 is constructed and arranged to send and receive data over communications medium 12. Specifically, network interface 46 is configured to receive transaction 20 from institutional client 18 over communications medium 12 and to send transaction result 28 to institutional client 18 over communications medium 12. Also, network interface 42 is constructed and arranged to receive data from storage device 15.

During operation, area mapping engine 40 generates a set of geographical areas, each having an identifier, fixed with respect to the Earth's surface. In some arrangements, area mapping engine 40 creates a fixed grid defined by selected longitude and latitude points; the set of geographical areas is defined by sets of such points, each set defining a set of vertices for the geographical area. Along these lines, the geographical areas are essentially the same size and shape; for example, the spherical squares described above. Area mapping engine 40 assigns identifiers to each geographical area; the identifiers are a number to which risk score engine 38 refers when assigning risk scores to transactions. Area mapping engine 40 stores information concerning the generated geographical areas in database 26. Further details of the fixed grid generated by area mapping engine 40 are considered with respect to FIG. 3.

Figure 3:
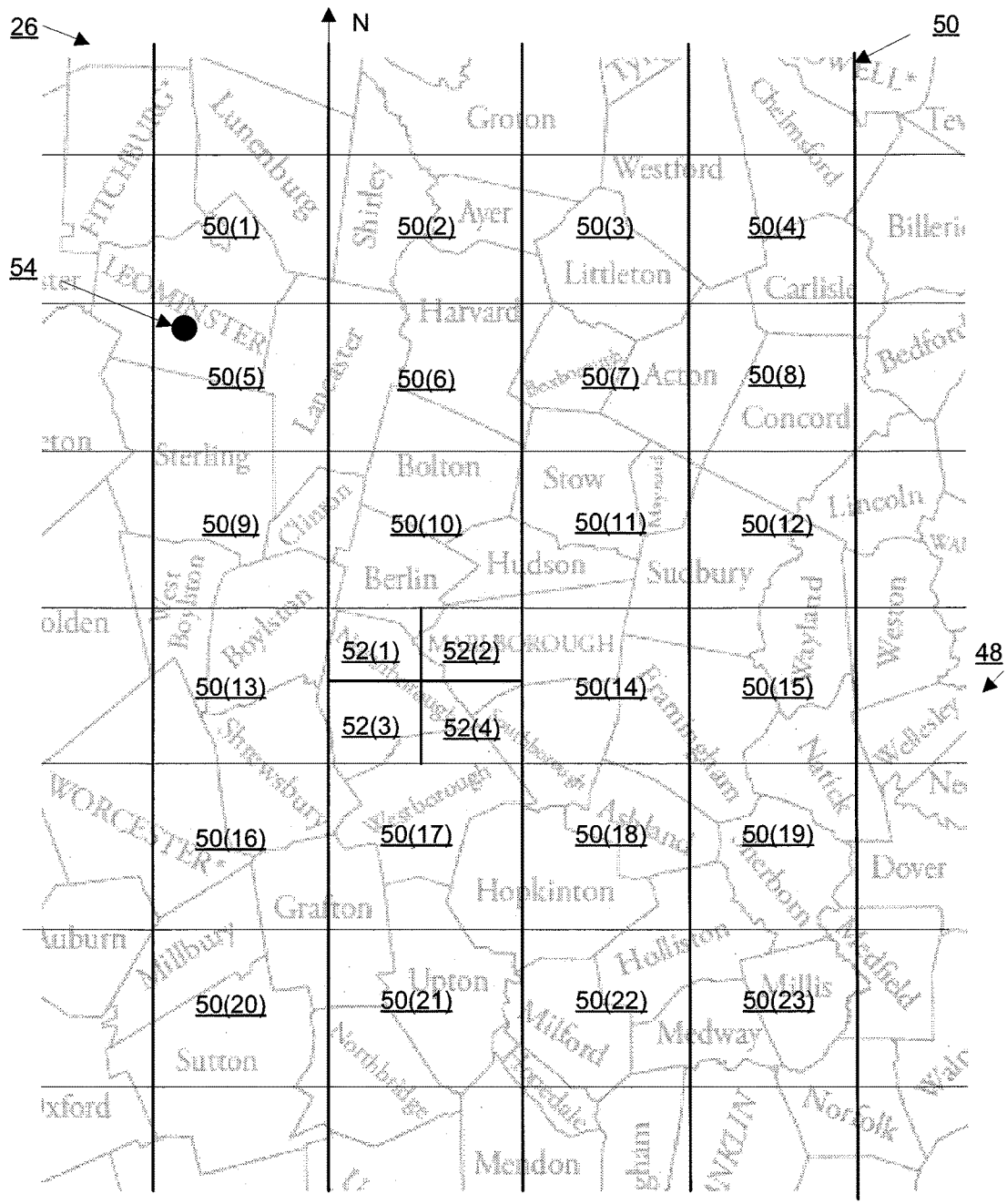
FIG. 3 is a schematic diagram illustrating a mapping of raw location data to a particular geographical area of a set of geographical areas stored in the database shown in shown in FIG. 1.

FIG. 3 illustrates an example of a set of geographical areas 48 being mapped to a part of the Earth's surface. In this particular example, a set of grid lines of a grid 50 which correspond to longitude and latitude lines are overlaid on a map of eastern central Massachusetts. Each vertex of grid 50 corresponds to a geographical area defines by the grid lines of grid 50. The geographical areas here are congruent spherical squares as the grid lines run parallel to longitude and latitude lines.

Each geographical area of grid 50 has an identifier assigned to it by area mapping engine 40; the identifiers are denoted in FIG. 3 by the number in parenthesis within the respective geographical area. For example, the area 50(1) has the identifier 1, 50(2) has the identifier 2, and so on. The areas are stored in database with reference to its four vertices (e.g., area 50(1) has vertices [41.59° N, 71.82° W], [41.65° N, 71.82° W], [41.59° N, 71.76° W], [41.65° N, 71.76° W]).

Note that the geographical areas each have sides which subtend about 0.06° from the Earth's center; at the scale presented in FIG. 3, the sides of the spherical squares have a length of about 6.5 km. In some arrangements, the sides have smaller length, e.g., 6 km, 5 km, 4 km, 3 km, 2 km, 1 km, or smaller; in other arrangements, the sides have larger length, e.g., 7 km, 8 m, 9 km, 10 km, or larger.

Sometime later, network interface 46 receives transaction 20. Upon the receipt, processor 36 stores its attribute values, including the value of a single longitude and latitude point 54, in memory 42. Area mapping engine 40 takes the single longitude and latitude point 54 from memory 42 and determines a particular geographical area 50(5) which contains the point 54. Area mapping engine 40 then sends the identifier of the particular geographical area 50(5) to risk score engine 38 for risk score assignment.

Risk score engine 38 then executes instructions derived from code 44 to access the attribute values from memory 42 as well as the geographical area identifier and assigns a risk score to transaction 20. In some arrangements, the risk score is based on a set of Bayesian weights, each of which corresponds to an attribute associated with transaction 20. Risk score engine 38 derives the value of each Bayesian weight from values of the attribute to which the Bayesian weight corresponds for previous transactions which are stored in database 26.

In some arrangements, geographical areas of grid 50 are not congruent and have different values of area. For example, area mapping engine 40 scales the area of each geographical area to a local population density. In particular, the area scaling can be such that the population of each geographical area is substantially the same as any other geographical area. In FIG. 3, four subdivided regions 52(1), 52(2), 52(3), 52(4) are equivalent to one of the other geographical areas, say, 50(1); such a subdivision results from a larger population density than in other parts of grid 50.

In some other arrangements, area mapping engine 40 assigns weight values to each geographical area in addition to an identifier. Risk score engine 38 would use such weight values as an additional factor in assigning a risk score to transaction 20. For example, a weight value assigned to a geographical area is in inverse proportion to a likelihood that a random user would be in that geographical area. In particular, area mapping engine 40 would assign a very high weight value to a geographical area in the middle of the Atlantic Ocean, as it is very unlikely that a random user would be in this area. Conversely, area mapping engine 40 would assign a very small weight value to a large city.

It should be understood that, in the example presented in the above description, area mapping engine 40 generates grid 50 once and bases geolocation values for all users on grid 50. In other arrangements, however, area mapping engine 40 generates a separate grid for different users. For example, suppose that user 32 lives in the area 50(10) and works in area 50(11). For user 32, area mapping engine 40 creates a single area from these two areas. A benefit of such customization is that it simplifies the analysis required for assigning a risk score to transaction 20. That is, transaction requests 16 occurring outside of the "home" area of user 32 are more likely to contribute to a high risk score than if user 32 had several "home" areas.

In still other arrangements, area mapping engine 40 associates a set of areas, not necessarily contiguous, to user 32. For example, user 32 is a business traveler that frequently visits several distinct regions around the Earth. These several distinct regions form the set of areas associated with the business traveler. Further, risk score engine 38 considers risky a transaction from this business traveler originating from an area not belonging to the set of areas.

Further, area mapping engine 40 can customize weights assigned to areas for different users. For example, suppose that user 32 travels internationally with a high frequency, and sends transaction requests while in the plane, over an ocean. Area mapping engine 40 assigns weights to the areas over the ocean that are not as high as the values described above.

Figure 4:
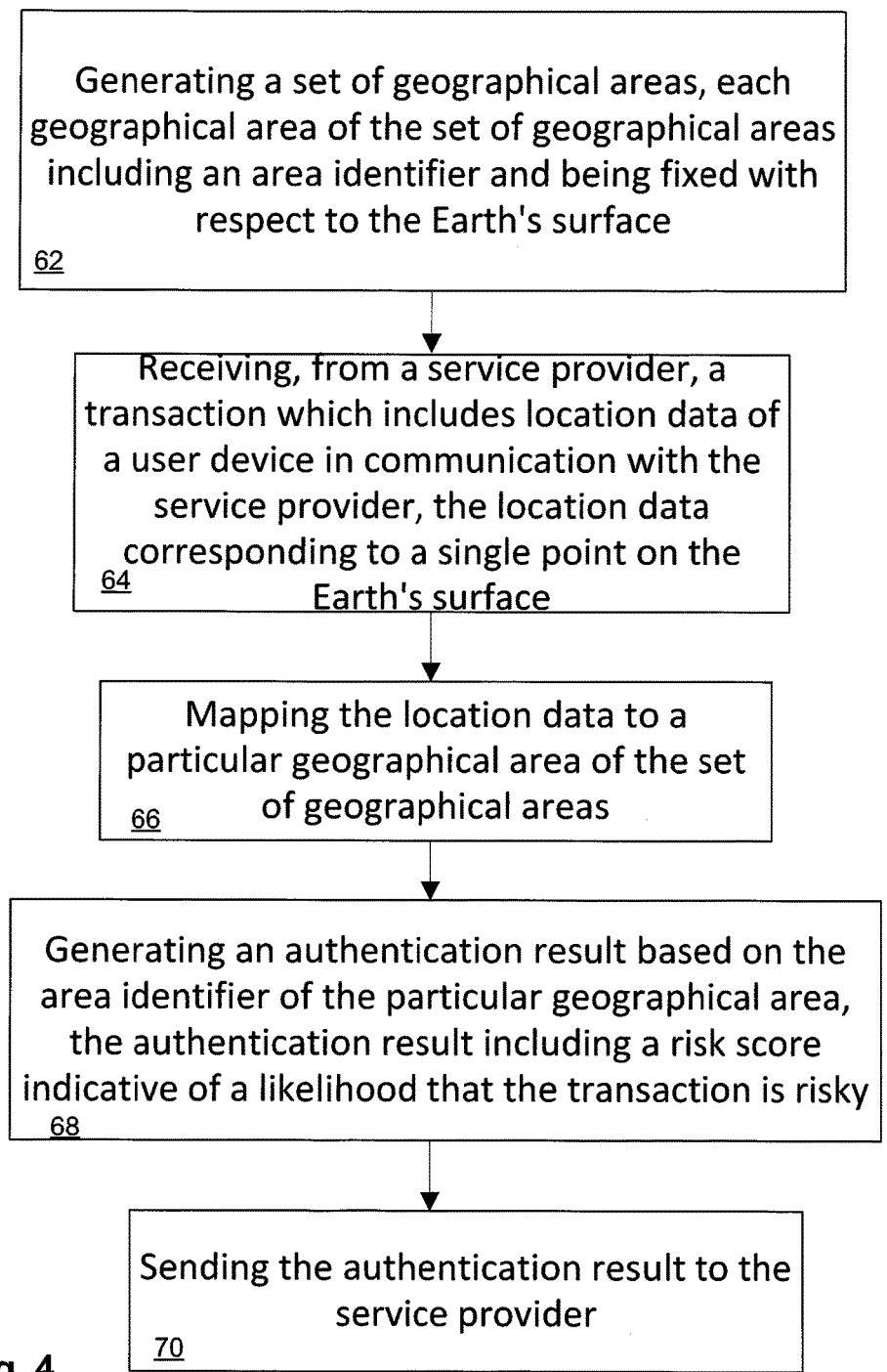
FIG. 4 is a flow chart illustrating a method of carrying out the improved technique within the electronic environment shown in FIG. 1.

FIG. 4 illustrates a method 60 of identifying risky transactions. In step 62, a set of geographical areas is generated, each geographical area of the set of geographical areas including an area identifier and being fixed with respect to the Earth's surface. In step 64, a transaction is received from a service provider, the transaction including location data of a user device in communication with the service provider, the location data corresponding to a single point on the Earth's surface. In step 66, the location data is mapped to a particular geographical area of the set of geographical areas. In step 68, an authentication result is generated based on the area identifier of the particular geographical area, the authentication result including a risk score indicative of a likelihood that the transaction is risky. In step 70, the authentication result is sent to the service provider.

While various embodiments of the invention have been particularly shown and described, it will be understood by those skilled in the art that various changes in form and details may be made therein without departing from the spirit and scope of the invention as defined by the appended claims.

For example, while the above description illustrated an area mapping engine 40 within adaptive authentication server 22, area mapping engine 40 could also work within institutional client 18. In this case, transaction 20 would contain an area identifier for user 32. Based on the area identifier in transaction 20, risk score engine 38 assigns a risk score to transaction 20.

Furthermore, it should be understood that some embodiments are directed to adaptive authentication server 22 which is constructed and arranged to identify risky transactions. Some embodiments are directed to adaptive authentication server 22. Some embodiments are directed to a system which identifies risky transactions. Some embodiments are directed to a process of identifying risky transactions. Also, some embodiments are directed to a computer program product which enables computer logic to identify risky transactions.

In some arrangements, adaptive authentication server 22 is implemented by a set of processors or other types of control/processing circuitry running software. In such arrangements, the software instructions can be delivered to adaptive authentication server 22 in the form of a computer program product 80 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of performing computerized authentication, the method comprising:
   generating, by a computer processor, a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;
   receiving, from a service provider and by the computer processor over a network, a transaction which includes GPS (Global Positioning Satellite) coordinates as location data of a user device in communication with the service provider, the location data corresponding to a single point on the Earth's surface as identified by the GPS coordinates;
   mapping, by the computer processor, the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;
   generating, by the computer processor, an authentication result based on the area identifier of the particular geographical area and not directly on the GPS coordinates received with the transaction, the authentication result including a risk score indicative of a likelihood that the transaction is risky; and
   sending, by the computer processor over the network, the authentication result to the service provider,
   wherein the method further comprises:
   receiving multiple first transactions for the user, each of the first transactions including respective GPS coordinates of the user device, the computer processor mapping the GPS coordinates received with each of the first transactions to a first area having a first area identifier;

receiving multiple second transactions for the user, each of the second transactions including respective GPS coordinates of the user device, the computer processor mapping the GPS coordinates received with each of the second transactions to a second area having a second area identifier; and creating, by the computer processor, a new area that includes both the first area and the second area, the new area having a single area identifier that identifies both the first area and the second area, the computer processor thereafter mapping GPS coordinates falling within the first area and GPS coordinates falling within the second area to the new area identified by the single area identifier, the computer processor thereby becoming insensitive to movement of the user device between the first area and the second area for purposes of computing risk scores.

2. A method according to claim 1, wherein generating the set of geographical areas further includes:

scaling the area of each geographical area of the set of geographical areas in inverse proportion to a local population density in a neighborhood of the geographical area.

3. A method according to claim 1, wherein each geographical area of the set of geographical areas further includes a weight value correlated to a likelihood of a random user being within the geographical area;

wherein generating an authentication result based on the area identifier of the particular geographical area further includes:

assigning, to the transaction, a risk score based on the weight value.

4. A method according to claim 3, wherein generating the set of geographical areas further includes:

scaling the weight value and the area of each geographical area of the set of geographical areas according to a user identifier of a particular user.

5. A method as in claim 1, further comprising:

identifying multiple geographical areas of the set of geographical areas that have been designated as home areas; and forming a new geographical area from the identified multiple geographical areas.

6. A method as in claim 1, wherein the method further comprises, prior to receiving the transaction, designating certain geographical areas of the set of geographical areas as home areas in response to tracking user behavior by receiving, over the network, electronically rendered geographical coordinates from the user device as the user device travels among the set of geographical areas, the home areas serving as low risk transaction locations to desensitize location accuracy to accommodate location errors;

wherein generating the authentication result includes assigning the risk score to the transaction based on whether the location data maps to a home area, the risk score being lower to indicate less risk when the location data maps to the home area, and the risk score being higher to indicate more risk when the location data does not map to the home area, and wherein designating certain geographical areas of the set of geographical areas as home areas in response to tracking user behavior as the user device travels among the set of geographical areas includes:

observing a frequency at which the user device is tracked in a certain geographical area;

identifying the certain geographical area as a home area based on the observed frequency.

7. A method as in claim 6, wherein each geographical area of the set of geographical areas further includes a weight value that is inversely proportional to a likelihood of a random user being within that geographical area, an increasing weight value of a geographical area increasing the risk score assigned to the transactions taking place within that geographical area; and wherein designating certain geographical areas of the set of geographical areas as home areas in response to tracking user behavior as the user device travels among the set of geographical areas further includes setting each of the weight values of the certain geographical areas of the set of geographical areas to be a value less than any of the weight values of the other geographical areas of the set of the geographical areas.

8. A method as in claim 7, further comprising, after observing the frequency at which the user device is tracked in the certain geographical area, decreasing the weight of the certain geographical area according to an increasing frequency at which the user device is tracked in the certain geographical area.

9. A method as in claim 1 wherein the computer processor is an adaptive authentication server computer that is constructed and arranged to perform adaptive authentication operations on transactions;

wherein the location data are latitude and longitude coordinates obtained from a GPS device within the user device;

wherein mapping the location data to a particular geographical area of the set of geographical areas includes locating, by the adaptive authentication server, a geographical area of the set of geographical areas in which a point defined by the latitude and longitude coordinates is inside.

10. An apparatus constructed and arranged to identify risk transactions, the apparatus comprising:

a network interface;

a memory; and a controller which includes controlling circuitry coupled to the memory, the controlling circuitry being constructed and arranged to:

generate a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;

receive, from a service provider and by the network interface over a network, a transaction which includes GPS (Global Positioning Satellite) coordinates as location data of a user device in communication with the service provider, the location data corresponding to a single point on the Earth's surface as identified by the GPS coordinates and being stored in the memory;

map the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;

generate an authentication result based on the area identifier of the particular geographical area and not directly on the GPS coordinates received with the transaction, the authentication result including a risk score indicative of a likelihood that the transaction is risky; and send, by the network interface over the network, the authentication result to the service provider, wherein the controlling circuitry is further constructed and arranged to:

receive multiple first transactions for the user, each of the first transactions including respective GPS coordinates of the user device, the computer processor mapping the GPS coordinates received with each of the first transactions to a first area having a first area identifier;

receive multiple second transactions for the user, each of the second transactions including respective GPS coordinates of the user device, the computer processor mapping the GPS coordinates received with each of the second transactions to a second area having a second area identifier; and create, by the controlling circuitry, a new area that includes both the first area and the second area, the new area having a single area identifier that identifies both the first area and the second area, the controlling circuitry constructed and arranged thereafter to map GPS coordinates falling within the first area and GPS coordinates falling within the second area to the new area identified by the single area identifier, the controlling circuitry thereby becoming insensitive to movement of the user device between the first area and the second area for purposes of computing risk scores.

11. An apparatus according to claim 10, wherein generating the set of geographical areas further includes:

scaling the area of each geographical area of the set of geographical areas in inverse proportion to a local population density in a neighborhood of the geographical area.

12. An apparatus according to claim 10, wherein each geographical area of the set of geographical areas further includes a weight value correlated to a likelihood of a random user being within the geographical area;

wherein generating an authentication result based on the area identifier of the particular geographical area includes:

assigning, to the transaction, a risk score based on the weight value.

13. A computer program product having a non-transitory, computer-readable storage medium which stores code to perform computerized authentication, the code including instructions to:

generate a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;

receive, from a service provider and by the network interface over a network, a transaction which includes GPS (Global Positioning Satellite) coordinates as location data of a user device in communication with the service provider, the location data corresponding to a single point on the Earth's surface as identified by the GPS coordinates and being stored in the memory;

map the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;

generate an authentication result based on the area identifier of the particular geographical area and not directly on the GPS coordinates received with the transaction, the authentication result including a risk score indicative of a likelihood that the transaction is risky; and send, by the network interface over the network, the authentication result to the service provider, wherein the code contains further instructions to:

receive multiple first transactions for the user, each of the first transactions including respective GPS coordinates of the user device, the computer processor mapping the GPS coordinates received with each of the first transactions to a first area having a first area identifier;

receive multiple second transactions for the user, each of the second transactions including respective GPS coordinates of the user device, the computer processor mapping the GPS coordinates received with each of the second transactions to a second area having a second area identifier; and create, by the controlling circuitry, a new area that includes both the first area and the second area, the new area having a single area identifier that identifies both the first area and the second area, the controlling circuitry constructed and arranged thereafter to map GPS coordinates falling within the first area and GPS coordinates falling within the second area to the new area identified by the single area identifier, the controlling circuitry thereby becoming insensitive to movement of the user device between the first area and the second area for purposes of computing risk scores.

14. A computer program product according to claim 13, wherein generating the set of geographical areas further includes:

scaling the area of each geographical area of the set of geographical areas in inverse proportion to a local population density in a neighborhood of the geographical area.

15. A computer program product according to claim 13, wherein each geographical area of the set of geographical areas further includes a weight value correlated to a likelihood of a random user being within the geographical area;

wherein generating an authentication result based on the area identifier of the particular geographical area includes:

assigning, to the transaction, a risk score based on the weight value.

* * * * *